(12) United States Patent
Kuffner et al.

(10) Patent No.: US 7,450,947 B2
(45) Date of Patent: Nov. 11, 2008

(54) METHOD AND APPARATUS FOR DYNAMIC SPECTRUM SHARING

(75) Inventors: Stephen L. Kuffner, Algonquin, IL (US); Roger L. Peterson, Inverness, IL (US); Eugene Visotsky, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/157,764

(22) Filed: Jun. 21, 2005

(65) Prior Publication Data

US 2006/0286934 A1    Dec. 21, 2006

(51) Int. Cl.
*H04Q 7/20* (2006.01)
*H04B 5/00* (2006.01)
*H04B 7/00* (2006.01)

(52) U.S. Cl. .............. 455/447; 455/448; 455/41.1; 455/41.2; 455/41.3; 455/454

(58) Field of Classification Search .......... 455/447, 455/448, 41.1–3, 67.11, 13, 454, 41, 67
See application file for complete search history.

(56) References Cited

U.S. PATENT DOCUMENTS

| | | | | |
|---|---|---|---|---|
| 5,752,164 A | * | 5/1998 | Jones | 455/454 |
| 5,949,793 A | * | 9/1999 | Bossard et al. | 370/487 |
| 6,798,381 B2 | * | 9/2004 | Benner et al. | 342/451 |
| 2002/0002052 A1 | * | 1/2002 | McHenry | 455/447 |
| 2006/0067354 A1 | * | 3/2006 | Waltho et al. | 370/433 |
| 2006/0166692 A1 | * | 7/2006 | Waltho et al. | 455/522 |

OTHER PUBLICATIONS

Adaptrum, Inc., "Comments by Adaptrum, Inc.," Notice of Proposed Rule Making and Order, FCC 04-113, pp. 1-24.

* cited by examiner

*Primary Examiner*—Matthew Anderson
*Assistant Examiner*—Wen W Huang

(57) ABSTRACT

A technique for dynamic spectrum sharing includes identifying (705) a plurality of radio nodes (115, 120), measuring (710) a local signal value (SV) at each radio node (110, 200), and determining (715) a transmit decision. Each radio node can measure a local signal value (SV) of a protected transmission and the radio nodes are within a uniform SV region of the protected transmission. The transmit decision is determined for at least one of the plurality of radio nodes based on the SV of each radio node in the plurality of radio nodes and at least one threshold value that is related to statistical characteristics of the protected transmission at an interference boundary (105) of the protected transmission and a desired probability of non-interference with the protected transmission at the interference boundary.

16 Claims, 4 Drawing Sheets

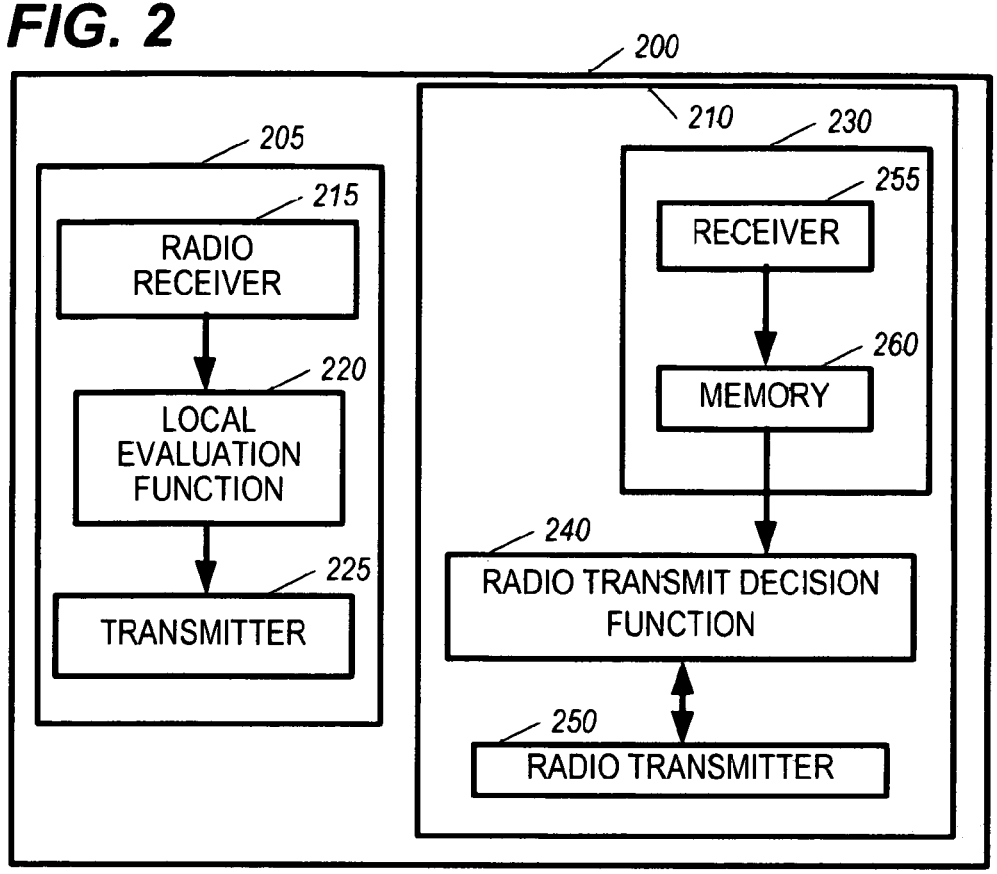
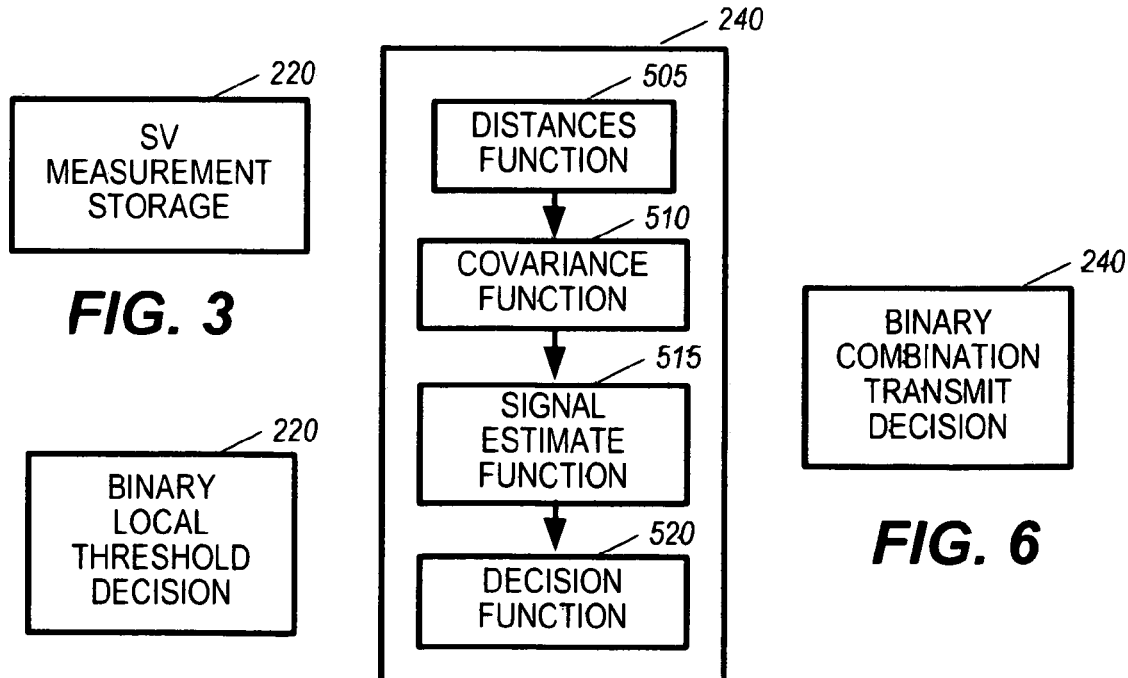

METHOD AND APPARATUS FOR DYNAMIC SPECTRUM SHARING

FIELD OF THE INVENTION

The present invention relates generally to radio communication systems and more particularly to controlling transmissions of a unit of a second radio system to prevent interference with a radio signal that may be received by radio receivers of a first radio system.

BACKGROUND

A known problem is interference to the reception of a desired radio signal caused by a secondary use radio signal. For units of two systems that operate using signals whose frequency bands overlap, interference is usually controlled by a government agency that restricts operations of units of the two systems to geographic areas that prevent such interference.

However, radio spectrum is very valuable and there are circumstances for which units of two systems that have overlapping frequency bands could operate without substantial interference. One example of these circumstances is a short range system that includes units that operate at very low power level in a region that is near, but not within a defined operational range of a wide area system. For a region within which the signal level transmitted by a unit of the wide area system is, to a high degree of likelihood, too low to be useful, the probability of interference to units of the wide area system by units of the short range system could be acceptably low.

This type of situation is proposed for use in the United States of America for commercial broadcast television transmissions and units identified herein as dynamic spectrum sharing units. Such dynamic spectrum sharing units would operate on commercial broadcast television frequencies but would have a built in control to prevent them from transmitting unless a probability of interference to television reception was acceptably low.

However, techniques currently proposed to accomplish the control of transmissions of units of a second system to achieve a desired certainty of non-interference to units of a first system severely limit the usefulness of dynamic system sharing.

BRIEF DESCRIPTION OF THE FIGURES

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a block diagram of an electronic device that can be used in the system of FIG. 1, in accordance with some embodiments of the present invention;

FIGS. 3 and 4 show block diagrams of a local evaluation function that may be used in the electronic device of FIG. 2, in accordance with embodiments of the present invention:

FIGS. 5 and 6 show block diagrams of a radio transmit decision function that may be used in the electronic device of FIG. 2, in accordance with embodiments of the present invention;

Figure 1:
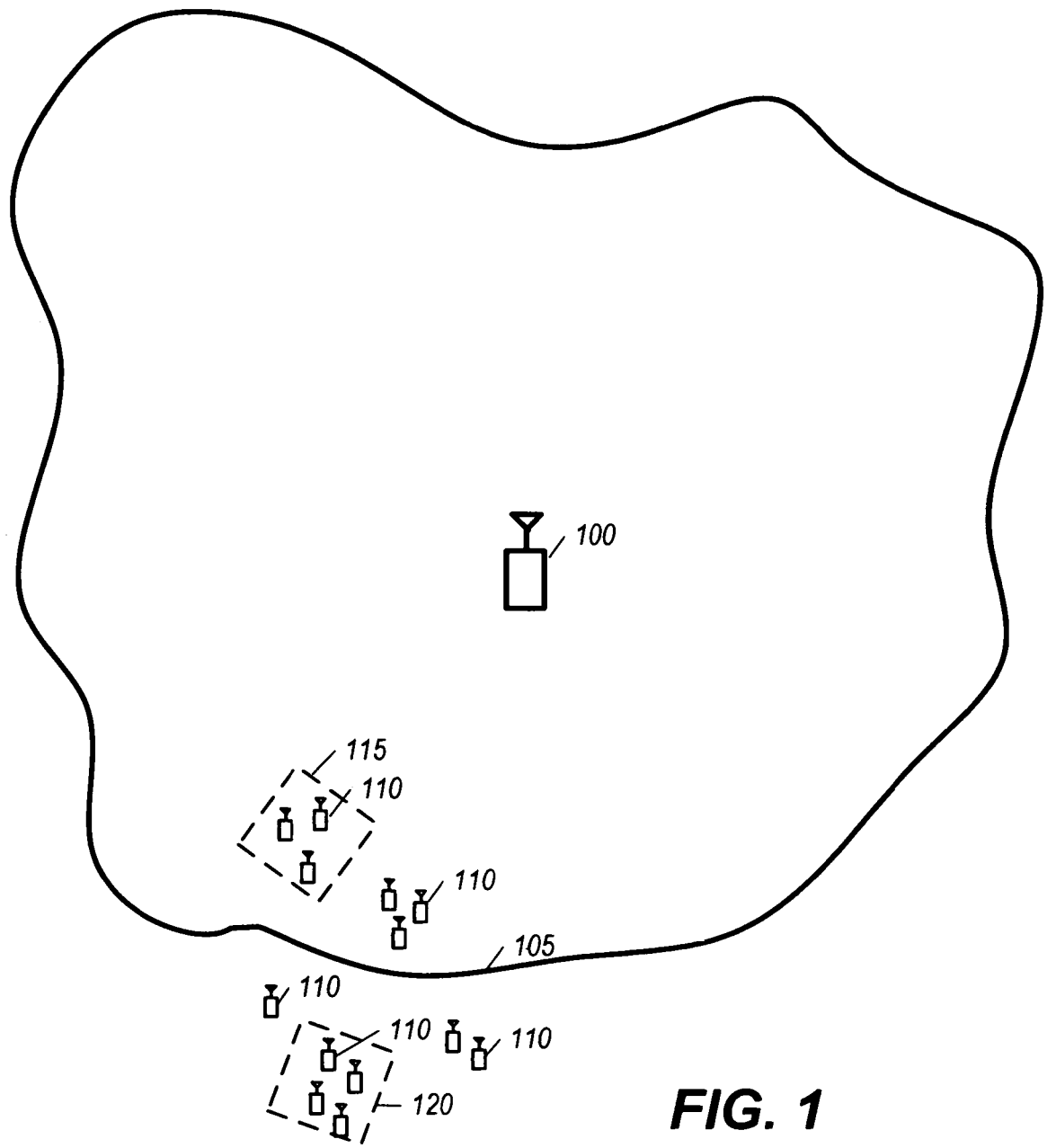
FIG. 1 is a topographic illustration of an example of a dynamic spectrum sharing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to dynamic spectrum sharing. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a topographic illustration shows an example of a dynamic spectrum sharing system in accordance with some embodiments of the present invention. Dynamic spectrum sharing, as used within this document, refers to techniques used to avoid interference to the reception of a radio signal transmission at receivers of a first radio system by controlling radio transmitting units of a second radio system to prevent radio signal transmissions by the radio transmitting units of the second radio system when the likelihood of such transmissions causing interference exceeds a desired value. Just one example of dynamic system sharing is a situation in which the first radio system comprises a commercial television broadcast transmitter and television receivers, and in which the second radio system comprises local or personal area radio transceiver devices, such as electronic devices that are Zigbee™-like devices, or electronic devices that communicate according to a standard similar to one of the Institute of Electrical and Electronic Engineers' 802.11 Wireless Local Area Network (WLAN) standards for unlicensed devices, such as 802.11 (b). For purposes of this document, the radio transmission of the first system is termed a protected transmission. In the example illustrated in FIG. 1, a radio transmitter 100 broadcasts a radio signal for reception by radio receivers that are not shown in FIG. 1. An interference boundary 105 of the protected transmission has been determined, either by a mathematical model of signal propagation, such as the Longley-Rice model, or by field measurements, at which the protected radio signal has a mean signal strength, $\mu$, and at which radio receivers of the first radio system are to have a desired probability of non-interference from radio transmitters (radio nodes) of the second radio system that transmit signals at a defined maximum signal level. At this interference boundary 105, the protected transmission has a statistical variance that may in some embodiments be modeled as a variance of a Gaussian distribution, $\sigma^2$. For the specific example of unlicensed devices used in the vicinity of an operational range of a commercial broadcast television transmitter that meets specifications of a Federal Communications Commission (FCC) license, the interference boundary 105 can be approximately equal to the Grade B contour defined by the FCC for broadcast television transmissions because the transmit power of the unlicensed devices is so small in comparison the broadcast power of a typical broadcast television transmitter.

In the illustration of FIG. 1, a number of radio nodes 110 of the second radio system are shown. The scale of the icons used to represent items in FIG. 1 are such that the user density and quantity of radio nodes 110 of the second radio system that are illustrated are substantially lower than that which may actually be realized in many systems that are according to embodiments of the invention. Of the radio nodes 110 illustrated, two groups are shown that are within region boundaries. In accordance with embodiments of the present invention, these boundaries define regions within which the mean value of the radio signal radiated by the radio transmitter 100 is essentially constant, which are termed uniform signal value (SV) regions herein. The mean value of the radio signal of course varies in most actual situations and by most mathematical models, decreasing as the distance from the transmitter increases, with the decrease being not linear, but rather to some exponent of the range from the transmitter that is typically in the range of 2 to 4. "Essentially constant" as used above, for some embodiments of the present invention, can mean on the order of ±3 dB, but in some instances variations up to ±6 dB may work reasonably well. Note that these uniform SV regions may be small closed regions that are square, circular, elliptical, or any closed shapes, or they could be a portion of a thin ring around the radio transmitter of the first system.

At least one radio node in a uniform SV region such as uniform SV regions 115, 120 can transmit radio signals having a frequency band that falls within a frequency band of the protected radio signal, or a frequency band that at least overlaps the frequency band of the protected radio signal to some extent. The transmit signal of such a radio node 110 is called herein a dynamic transmit signal. When the radio nodes 110 of the second radio system are within uniform SV regions, statistical methods that are described herein below are sufficiently accurate to be used to achieve the desired results (a desired probability of non-interference to the protected radio signal).

Referring to FIG. 2, a block diagram of an electronic device 200 that can be one of the radio nodes 110 described with reference to FIG. 1 is shown, in accordance with some embodiments of the present invention. The electronic device (radio node) 200 is one of a plurality of radio nodes 110 that are within a uniform SV region of the protected transmission. The radio node 200 comprises an evaluation section 205 for making a local evaluation and a dynamic section 210 for controlling a dynamic transmit signal. Not all radio nodes 110, 200 need to include both sections 205, 210, but it is anticipated that in many embodiments, all radio nodes 110 will include both sections 205, 210. (A sufficiently accurate transmit decision could be made if the radio node in which the transmit decision were being made lacked the evaluation section 205). The evaluation section 205 comprises a radio receiver 215 that can measure a signal-to-noise ratio or absolute signal strength of the protected transmission. For purposes of this document, the term "signal value" (SV) will be used to describe the one of these two values that is used in a particular system embodiment. The SV is coupled to a local evaluation function 220, and a local evaluation output of the local evaluation function couples local evaluation information to a transmitter 225. The transmitter 225 communicates the local evaluation information to at least one dynamic section 210 of a radio node 110 in the same uniform SV region, which may be the same radio node 200 or a different one. The transmission of the transmitter 225 is in some embodiments a type that will not interfere with the protected transmission regardless of the location of the radio node 200, such as a radio transmitter operating at a frequency that does not interfere with the protected transmissions. Transmitter 225 may alternatively be a non-radio transmitter in some embodiments, such as a wireline or optical transmitter. In some embodiments in which the radio nodes 110 are in positions that do not change frequently, the transmitter 225 may transmit at a frequency that may interfere with the protected transmissions, but the transmissions may be allowed since they may be sufficiently infrequent that the desired probability of non-interference is met in spite of them. The communication from transmitter 225 to the dynamic section 210 need not be direct; for example, the information may pass through an intermediate system of nodes.

Referring to FIG. 3, a block diagram of the local evaluation function 220 is shown as it is embodied in accordance with embodiments of the present invention described herein as soft decision embodiments. In these soft decision embodiments, a value representing the actual SV measurement is stored by an SV measurement storage function 220 and coupled to transmitter 225 for transmission to at least one dynamic section 210 of a radio node 110 in the same uniform SV region.

Referring to FIG. 4, a block diagram of the local evaluation function 220 is shown as it is embodied in accordance with embodiments of the present invention described herein as hard decision embodiments. In these hard decision embodiments, a binary value is generated by a binary local threshold decision function 220 based on the measured local SV and a threshold signal level, using techniques described in more detail below with reference to FIGS. 7 and 9, and the binary value is coupled to transmitter 225 for transmission to at least one dynamic section 210 of a radio node 110 in the same uniform SV region.

Referring back to FIG. 2, the dynamic section 210 of the radio node 200 comprises means for obtaining a set of local evaluations 230, a transmit decision function 240, and a radio transmitter 250. The set of local evaluations are obtained from the transmissions of local evaluations from at least one other radio node 110 that are received by the dynamic section 210. The set of local evaluations are coupled from the means for obtaining the set of local evaluations 230 to the radio transmit decision function 240. The radio transmit decision function 240 makes a transmit decision based on the set of local evaluations and at least one threshold value. These threshold values are related to statistical characteristics of the protected transmission at an interference boundary of the protected transmission, such as the interference boundary 105 described above with reference to FIG. 1, whereat a desired probability of non-interference with the protected transmission is calculated to be achieved. The threshold value for soft decision embodiments ($T_S$) is used directly by the radio transmit decision function 240 One binary local threshold value for hard decision embodiments ($T_H$) is used in the local evaluation function 220 of each radio node 110, and another numerical threshold value may be used by the radio transmit decision function 240, as described in more detail below with reference to FIG. 9. The numerical value use for the hard decision embodiment may be indirectly related to statistical characteristics of the protected transmission at an interference boundary of the protected transmission. Thus, in both the soft decision and hard decision embodiments, the radio transmit decision is based on at least one threshold value. The transmit decision is used to control the radio transmitter 250, which is a radio transmitter that can transmit a dynamic transmit signal—i.e., one that transmits at a defined maximum level that is one parameter that is used to determine the interference boundary, and that would potentially interfere with the protected transmission when transmitted within the interference boundary. The decision is made in a manner described below with reference to FIGS. 7, 8 and 9, and serves to prevent interference to the protected transmission, to a desired level of probability, while beneficially not unduly preventing transmissions by the secondary radio node or nodes.

Referring to FIG. 5, a block diagram of the radio transmit decision function 240 of the radio node 200 is shown, in accordance with soft decision embodiments of the present invention. The radio transmit decision function 240 comprises a distances function 505, a covariance function 510, a signal estimate function 515, and a decision function 520. The distances function 505 determines distances between each distinct pair of radio nodes 110, including radio node 200. This may be done in a variety of ways that use techniques that are known. For example, the radio nodes 110, 200 may each include a global positioning device and may communicate their respective positions to the radio node 200 via transmitters 225 of radio nodes 110 and receiver 255 of radio node 200. The distances are coupled to the covariance function, which generates a covariance matrix of the SV values based on the distances and couples it to the signal estimate function 515, which determines an estimated signal value of the protected transmission in the uniform SV region based on the covariance matrix and the local SV measurement at each radio node 110, 200. The decision function 520 accepts the estimated signal value and compares it to a threshold value that is based on the mean and standard deviation of the protected signal at the interference boundary 105, which have been established as system parameters. When the estimated signal value is less than the threshold value, an output of the decision function 520 (which is therefore also a control output of the radio transmit decision function 240) controls the radio transmitter 250 so as to allow it to transmit a signal which should not interfere with the protected signal. Otherwise, the output of the decision function 520 controls the radio transmitter 250 so as to prevent it from transmitting.

Referring to FIG. 6, a block diagram of the radio transmit decision function 240 of the radio node 200 is shown, in accordance with hard decision embodiments of the present invention. The radio transmit decision function 240 in these embodiments comprises a binary combination transmit decision function 240. The binary combination transmit decision function 240 compares a combination of the local threshold decisions determined at each radio node to a numerical value to determine the transmit decision for the plurality of radio nodes 110. The numerical value is a system parameter that has been determined to provide the desired probability of non-interference. When the combination is less than the numerical value, an output of the binary combination transmit decision function 240 controls the radio transmitter 250 so as to allow it to transmit a signal which should not interfere with the protected signal. Otherwise, the output of the binary combination transmit decision function 240 controls the radio transmitter 250 so as to prevent it from transmitting.

The output of the radio transmit decision function 240 as described above with reference to both FIGS. 5 and 6 is equally applicable to all the radio nodes 110, 200 in the uniform SV region and may therefore be communicated to, and used to control the transmissions of some or all of the other radio nodes 110, 200 in the uniform SV region. When the output of the radio transmit decision function 240 is communicated to other radio nodes, it will be appreciated that those radio nodes need not include all the features of the dynamic section 210; they would only need an ability to receive the transmit decision and couple it to the radio transmitter 250.

In other embodiments not shown in FIGS. 2-6, the means for obtaining a set of local evaluations 230 and the transmit decision function 240 of the dynamic section 210 may be located not in any of the radio nodes that are within a uniform SV region. For example, the means for obtaining a set of local evaluations 230 and the transmit decision function 240 could be located in a central server device from which the transmit decision is transmitted to the radio nodes 110, 200, which would only need an ability to receive the transmit decision and couple it to the radio transmitter 250.

Figure 7:
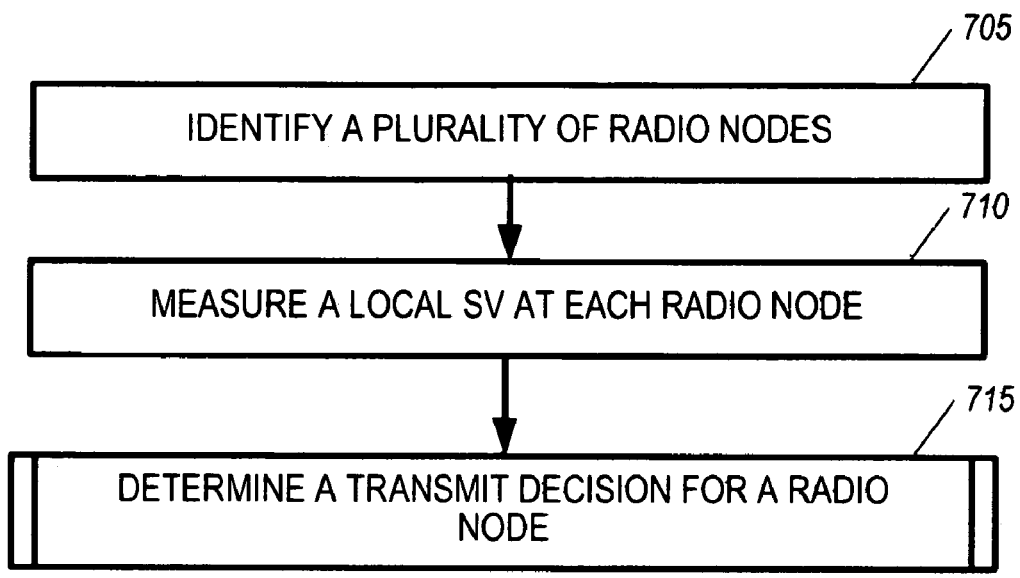
FIG. 7 is a flow chart that shows some steps of a method for dynamic spectrum sharing, in accordance with some embodiments of the present invention.

Referring to FIG. 7, a flow chart shows some steps of a method for dynamic spectrum sharing, in accordance with some embodiments of the present invention. At step 705, a plurality of radio nodes are identified. For this plurality of radio nodes, each radio node can measure a local signal value (SV) of a protected transmission and is within a uniform SV region of the protected transmission. A local SV is measured at each radio node at step 710. A transmit decision is determined at step 715 for at least one of the plurality of radio nodes based on the SV of each radio node in the plurality of radio nodes and a threshold value.

The threshold value is related to statistical characteristics of the protected transmission at the interference boundary of the protected transmission and the desired probability of non-interference. For some of the soft decision embodiments described above with reference to FIGS. 1, 2, 3, and 5, the threshold value, $T_S$, used by the decision function 520 may be determined as:

$$T_S = \mu - \frac{\sigma}{\sqrt{1^T \Sigma^{-1} 1}} Q^{-1}(1 - P_D) \qquad \text{Eq. 1}$$

wherein $\mu$ and $\sigma$ are, respectively, an estimated mean and an estimated standard deviation of the protected transmission at an interference boundary, $\Sigma$ is a covariance matrix of the local SV measurements described below with reference to equation 2, $P_D$ is the desired probability of non-interference with the protected transmission at the interference boundary, and $Q^{-1}$ is the inverse of the Gaussian probability upper tail function. For some of the hard decision embodiments described above with reference to FIGS. 1, 2, 4, and 6, the threshold value used by the binary combination transmit decision function 240 (FIG. 6) is a numerical value that is no greater than the number of radio nodes that are measuring SV within the uniform SV region. This threshold signal is described in some more detail below with reference to equation 5.

Figure 8:
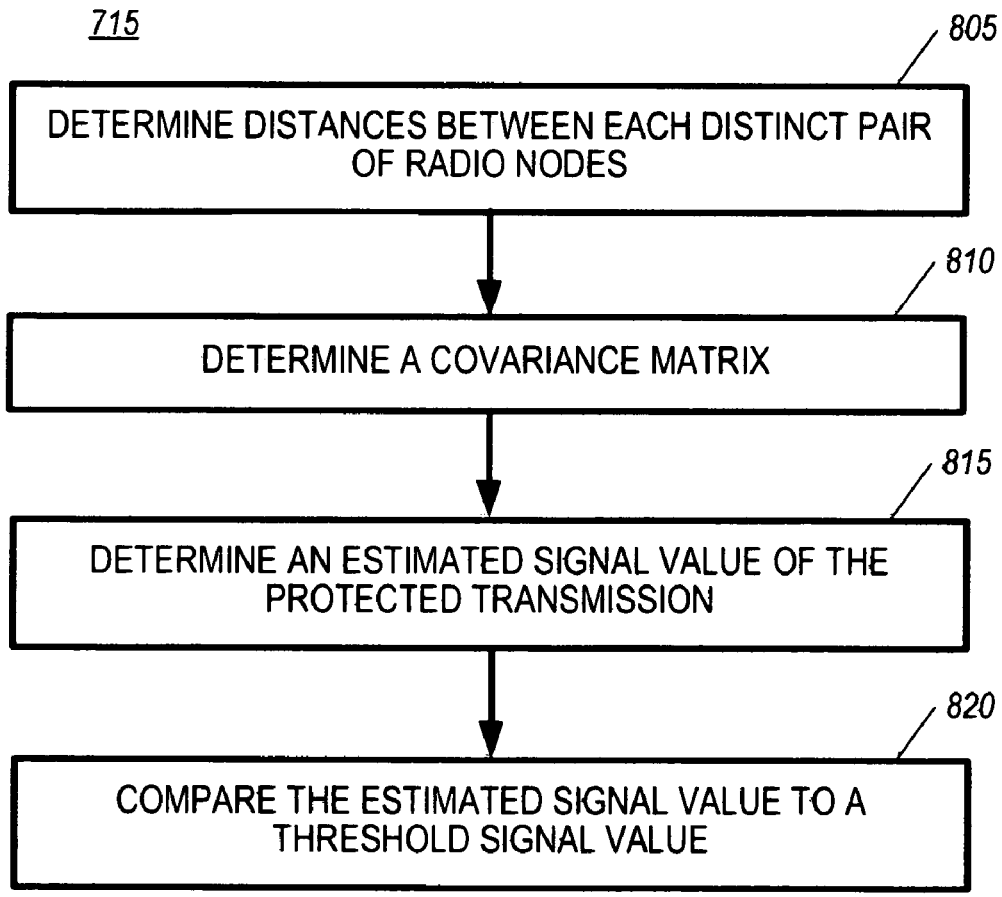
FIGS. 8 and 9 are flow charts that show some steps of two methods for accomplishing a transmit decision step; in accordance with some embodiments of the present invention.

Referring to FIG. 8, a flow chart shows some steps of a method for accomplishing the determination of the transmit decision at step 715 (FIG. 7) for soft decision embodiments of the present invention. At step 805, distances between each distinct pair of radio node are determined by the distances function 505 (FIG. 5). A covariance matrix, Σ, of the local SV measurements is determined by the covariance function 510 (FIG. 5) for the set of radio nodes at step 810, in some embodiments as follows $$\sum_{i,j} = \sigma^2 \times e^{-\frac{d_{ij}}{d}} \quad \text{Eq. 2}$$

wherein $d_{ij}$ is the distance between radio nodes i and j, and d is a decorrelation distance. The decorrelation distance is a system-level parameter dependent on the particular scenario of the radio node network deployment. An estimated signal value of the protected transmission in the uniform SV region is then determined by signal estimate function 515 (FIG. 5) based on the covariance matrix and the local SV measurement at each radio node. In some embodiments, the estimated signal value is determined as $$\frac{1^T \Sigma^{-1} SV_U}{1^T \Sigma^{-1} 1} \quad \text{Eq. 3}$$

wherein $SV_u$ is a vector consisting of the local SV measurements, Σ is the covariance matrix set forth in equation 2, and $1^T$ is a transposed vector of ones. At step 820 the estimated signal value of the protected transmission is compared by the decision function 520 (FIG. 5) to the threshold value to determine the transmit decision for the plurality of radio nodes.

Figure 9:
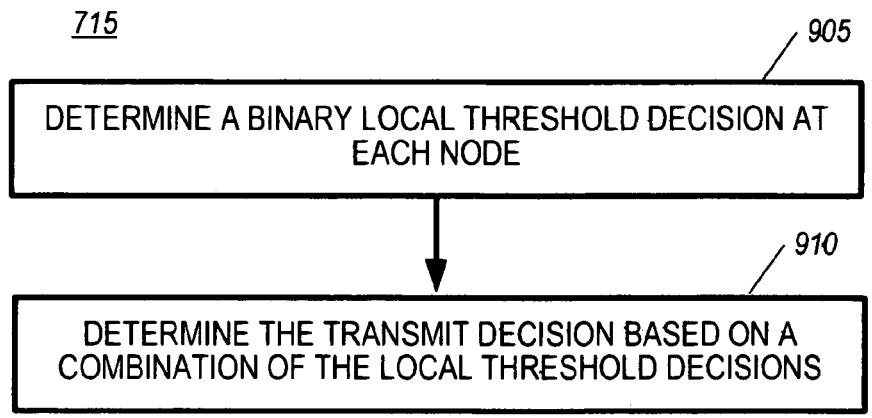

Referring to FIG. 9, a flow chart shows some steps of a method for accomplishing the determination of the transmit decision at step 115 (FIG. 7) for hard decision embodiments of the present invention. At step 905, a binary local threshold decision at each radio node is determined, based on the local SV and a threshold value, $T_H$, which in some embodiments may be determined as:

$$T_H = \mu - \sigma \times Q^{-1}((1 - P_D)^{1/n}) \quad \text{Eq. 4}$$

wherein the symbols other than $T_H$ have the same interpretation as those in equation 1. Equation 4 is a model derived under an assumption that the local SV measurements made by the radio nodes are independent and an assumption that an "AND" rule is used by the binary combination transmit decision function 240 (FIG. 6) as described in more detail below.

In other hard decision embodiments, the threshold value cannot be modeled by a closed form expression, but a bounding technique may be employed to conservatively set the threshold value so that the attained probability of non-interference is higher than the desired probability. Such techniques are taught, for example, in R. G. Gallager and C. W. Helstrom, "A Bound on Probability that a Gaussian Process Exceeds a Given Threshold". *IEEE Transactions on Information Theory*. NO 1, January 1969, pp. 163-166.

At step 910, a transmit decision is made by the binary combination transmit decision function 240 (FIG. 6), which is generalized as:

$$\sum_{i=1}^{n} B_i \geq T_N \quad \text{Eq. 5}$$

wherein $T_N$ denotes a detection threshold that is a numerical value less than or equal to the number of radio nodes within the uniform SV region that are measuring and reporting the binary local threshold decisions to a dynamic section 210. In some embodiments an "AND" rule that simply corresponds to $T_N=n$ may be used, whereas in others, a "majority vote" rule may be used, in which $T_N=\lceil n/2 \rceil$.

Figure 10:
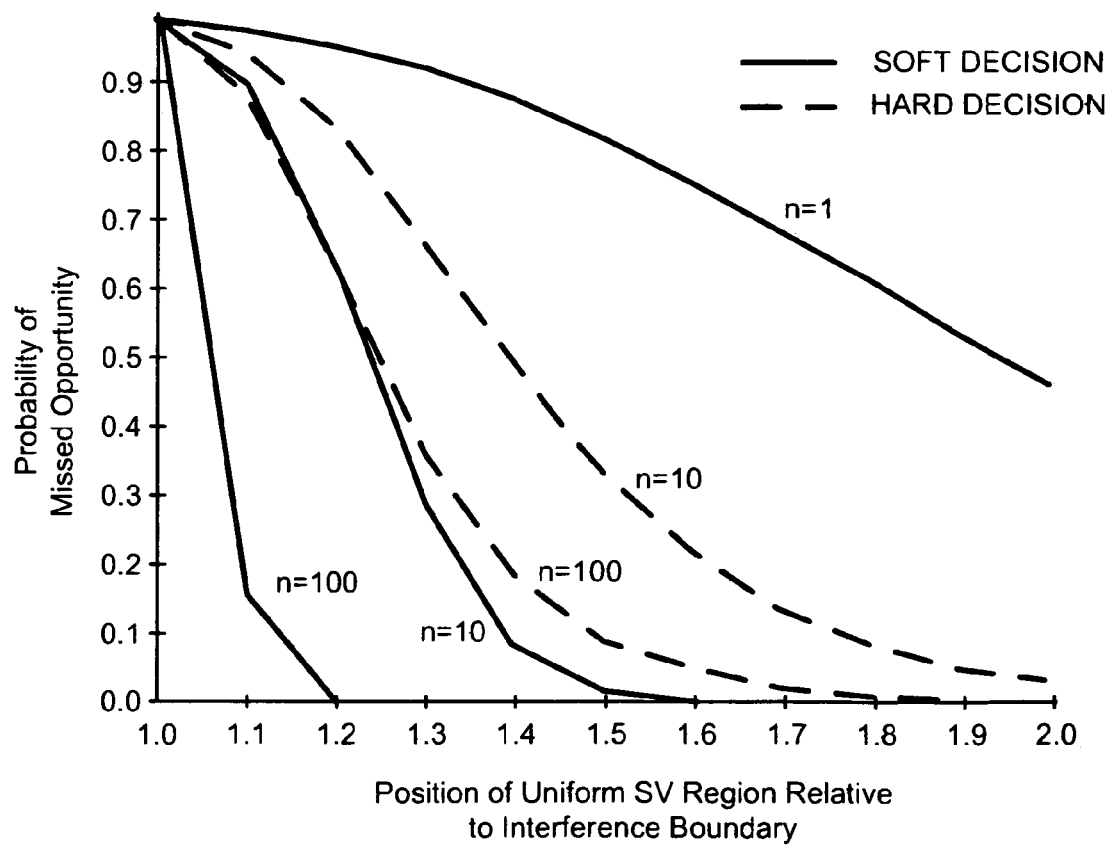
FIG. 10 is a graph that shows plots of probabilities of missed opportunities versus the distance of a set of radio nodes beyond an interference boundary, in accordance with some embodiments of the present invention.

Referring to FIG. 10, a graph shows plots of probabilities of missed opportunities versus the distance of a set of radio nodes beyond an interference boundary, in accordance with some embodiments of the present invention. A missed opportunity is when a radio node could have transmitted with the desired probability of non-interference, but was controlled to not transmit. The model used to generate the plots assumes a propagation model in which the radio signal level varies with range R as $R^{-3.5}$ and has a standard deviation of 10 dB. The signal strengths of the protected signal at the radio nodes are assumed to be independent. The distance ratios on the horizontal axis are ratios of the distance by which the center of the uniform SV region is beyond the interference boundary (which is circular in this model), to the radius of the interference boundary, wherein the interference boundary is a range at which the signal level of the protected signal given by the propagation model is at a value that should assure a small (e.g. 0.01) probability of interference with a radio node that is transmitting at the interference boundary. The numbers on the family of plots indicate the plurality of radio nodes. As evident in FIG. 10, the probability of missed opportunity is very high near the interference boundary but begins to decrease as the uniform SV region is moved away from the interference boundary. The curves decrease more rapidly as more radio nodes cooperate for spectrum sensing. Note that for a single radio node the probability of missed opportunity remains unacceptably high even at a distance from the transmitter of the protected transmission that is twice the radius of the interference boundary. Furthermore, note that the soft decision strategy significantly outperforms the hard decision strategy in terms of the probability of missed opportunity.

Thus, controlling the transmissions of radio nodes that are within uniform SV regions using techniques described herein that use measurements made by a plurality of the radio nodes within the uniform SV regions substantially increase the circumstances under which the radio nodes are allowed to transmit in comparison to prior art techniques, while maintaining the same desired probability of non-interference.

It will be appreciated that embodiments of the invention described herein may be comprised of one or more conventional processors and unique stored program instructions that control the one or more processors to implement, in conjunction with certain non-processor circuits, some, most, or all of the functions of the electronic devices described herein. The non-processor circuits may include, but are not limited to, a radio receiver, a radio transmitter, signal drivers, clock circuits, power source circuits, and user input devices. As such, these functions may be interpreted as steps of a method to perform dynamic spectrum sharing. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for implementing these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such unique stored program instructions, ICs, or other means with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for dynamic spectrum sharing, comprising:
   identifying a plurality of radio nodes, for which plurality each radio node can measure a local signal value (local SV) of a protected transmission and for which plurality the radio nodes are within a uniform SV region of the protected transmission, wherein the local signal value is based on a signal power of the protected transmission at a radio node;
   measuring the local SV at each radio node; and
   determining a transmit decision for at least one of the plurality of radio nodes based on the local SV of each radio node in the plurality of radio nodes and at least one threshold value that is related to statistical characteristics of the protected transmission at an interference boundary of the protected transmission and a desired probability of non-interference with the protected transmission at the interference boundary, wherein the uniform SV region is a region within which a mean of the protected transmission power level over time at any two points within the region differs by no more than ±6 db.

2. The method for dynamic spectrum sharing according to claim 1, wherein the determining of the transmit decision further comprises:
   generating a spatial covariance matrix of the local SV measurements for the set of radio nodes;
   determining an estimated signal value of the protected transmission in the uniform SV region based on the spatial covariance matrix and the local SV measurement at each radio node; and
   comparing the estimated signal value of the protected transmission to one of the at least one threshold values to determine the transmit decision for the plurality of radio nodes.

3. The method for dynamic spectrum sharing according to claim 2, wherein the generation of the spatial covariance matrix of the local SV measurements further comprises determining distances between each distinct pair of radio nodes.

4. The method for dynamic spectrum sharing according to claim 2, wherein the estimated signal value is determined as $$\frac{1^T \Sigma^{-1} SV_U}{1^T \Sigma^{-1} 1},$$

wherein SVu is a vector consisting of the local SV measurements, $\Sigma$ is a covariance matrix based on distances between distinct pairs of the plurality of radio nodes, and 1T is a transposed vector of ones.

5. The method for dynamic spectrum sharing according to claim 2, wherein one of the at least one threshold values is determined as $$T = \mu - \frac{\sigma}{\sqrt{1^T \Sigma^{-1} 1}} Q^{-1}(1 - P_D),$$

and wherein µ and sigma are, respectively, an estimated mean and an estimated standard deviation of the protected transmission within the uniform SV region, $\Sigma$ is a covariance matrix of the local SV measurements, PD is the desired probability of non-interference with the protected transmission, and Q is a Gaussian probability upper tail function.

6. The method for dynamic spectrum sharing according to claim 2, wherein the generating of the spatial covariance matrix of the local SV the determining of an estimated signal value of the protected transmission in the uniform SV region, and the determining of a transmit decision for the set of radio nodes are all performed in at least one radio node of the plurality of radio nodes.

7. The method for dynamic spectrum sharing according to claim 1, further comprising:
   determining a binary local threshold decision at each radio node based on the local SV and one of the least one threshold values; and
   comparing a summation of the binary local threshold decisions determined at each radio node to a numerical value to determine the transmit decision for the at least one of the plurality of radio nodes.

8. The method for dynamic spectrum sharing according to claim 7, wherein the at one of the at least one threshold values is determined as $T=\mu-\sigma \times Q^{-1}((1-P_D)^{1/m})$, wherein µ and sigma are, respectively, an estimated mean and an estimated standard deviation of the protected transmission within the uniform SV region, PD is the desired probability of non-interference with the protected transmission, and Q is the a Gaussian probability upper tail function.

9. The method for dynamic spectrum sharing according to claim 7, further comprising generating a spatial covariance matrix of the local SV measurements for the set of radio nodes, wherein the determining of one of the at least one threshold values is further based on the spatial covariance matrix.

10. An electronic device, comprising:
    means for obtaining a set of local evaluations, wherein each local evaluation in the set of local evaluations is based on a signal value (SV) measurement of a protected transmission made by a radio node of a plurality of radio nodes, and wherein the plurality of radio nodes are within a uniform SV region of the protected transmission, and wherein the signal value is based on a signal power of the protected transmission at a radio node; and
    means for determining a transmit decision for at least one of the plurality of radio nodes based on the set of local evaluations and at least one threshold value that is related to statistical characteristics of the protected transmission at an interference boundary of the protected transmission and a desired probability of non-interference with the protected transmission at the interference boundary, wherein the uniform SV region is a region within which a mean of the protected transmission power level over time at any two points within the region differs by no more than ±6 db.

11. The electronic device according to claim 10, wherein the means for obtaining comprises:
a radio receiver that receives and decodes a set of messages that provide the set of local evaluations; and
a memory that stores the set of local evaluations.

12. The electronic device according to claim 10, wherein each local evaluation in the set of local evaluations is a local signal value measurement of the protected transmission made by a radio node of the plurality of radio nodes, and wherein the means for determining a transmit decision comprises:
a means for obtaining distances between each distinct pair of radio nodes;
a means for generating a spatial covariance matrix of the local SV measurements based on distances between each distinct pair of radio nodes a means for determining an estimated signal value of the protected transmission in the uniform SV region based on the spatial covariance matrix and the local SV measurement at each radio node; and
a means for determining the transmit decision for the plurality of radio nodes by comparing the estimated signal value of the protected transmission to one of the at least one threshold values.

13. The electronic device according to claim 12, further comprising a function that determines one of the at least one threshold values as $$T = \mu - \frac{\sigma}{\sqrt{1^T \Sigma^{-1} 1}} Q^{-1}(1 - P_D),$$

wherein μ and sigma are, respectively, an estimated mean and an estimated standard deviation of the protected transmission within the uniform SV region, PD is the desired probability of non-interference with the protected transmission, and Q is a Gaussian probability upper tail function.

14. The electronic device according to claim 10, wherein each local evaluation is a binary local threshold decision that is a result of a comparison of the local SV measurement of the protected transmission to one of the at least one threshold value, and wherein the means for determining a transmit decision bases the transmit decision on a binary combination of the set of local evaluations.

15. The electronic device according to claim 14, further comprising a function that determines the one of the at least one threshold values as $T=\mu-\sigma\times Q^{-1}((1-P_D)^{1/n})$, wherein μ and sigma are, respectively, an estimated mean and an estimated standard deviation of the protected transmission within the uniform SV region, PD is the desired probability of non-interference with the protected transmission, and Q is a Gaussian probability upper tail function.

16. A processor having a set of program instructions stored therein for controlling the processor to perform dynamic spectrum sharing, the set of program instructions comprising:
instructions for identifying a plurality of radio nodes, for which plurality each radio node can measure a local signal value (local SV) of a protected transmission and for which plurality the radio nodes are within a uniform SV region of the protected transmission, wherein the local signal value is based on a signal power of the protected transmission at a radio node;
instructions for measuring the local SV at each radio node; and
instructions for determining a transmit decision for at least one of the plurality of radio nodes based on the local SV of each radio node in the plurality of radio nodes and at least one threshold value that is related to statistical characteristics of the protected transmission at an interference boundary of the protected transmission and a desired probability of non-interference with the protected transmission at the interference boundary, wherein the uniform SV region is a region within which a mean of the protected transmission power level over time at any two points within the region differs by no more than ±6 db.

* * * * *